US012572991B2

(12) United States Patent
Tsuchiya et al.

(10) Patent No.: US 12,572,991 B2
(45) Date of Patent: Mar. 10, 2026

(54) CONGESTION INFORMATION DISPLAY SYSTEM, SENSOR DEVICE, CONGESTION INFORMATION DISPLAY METHOD, AND STORAGE MEDIUM

(71) Applicant: TOPPAN Holdings Inc., Tokyo (JP)

(72) Inventors: Ryo Tsuchiya, Tokyo (JP); Fumika Ichinose, Tokyo (JP)

(73) Assignee: TOPPAN Holdings, Inc., Tokyo (JP)

( * ) Notice: Subject to any disclaimer, the term of this patent is extended or adjusted under 35 U.S.C. 154(b) by 401 days.

(21) Appl. No.: 17/989,135

(22) Filed: Nov. 17, 2022

(65) Prior Publication Data

US 2023/0072424 A1 Mar. 9, 2023

Related U.S. Application Data

(63) Continuation of application No. PCT/JP2021/019689, filed on May 25, 2021.

(30) Foreign Application Priority Data

May 26, 2020 (JP) ................................. 2020-091389

(51) Int. Cl.
*G06Q 50/12* (2012.01)
*G06F 3/0346* (2013.01)

(52) U.S. Cl.
CPC ........... *G06Q 50/12* (2013.01); *G06F 3/0346* (2013.01)

(58) Field of Classification Search
CPC .. G06Q 50/26; G06Q 10/067; G06F 3/04886; G06F 30/20; G06F 3/03545; G06F 3/165; G06F 3/0346

(Continued)

(56) References Cited

U.S. PATENT DOCUMENTS

| | | | | |
|---|---|---|---|---|
| 10,571,289 | B2 * | 2/2020 | Matsuzawa | ............. G06F 16/29 |
| 2017/0160088 | A1 * | 6/2017 | Azami | ................... G01C 21/12 |
| 2017/0328726 | A1 * | 11/2017 | Matsuzawa | ............ G09B 29/10 |

FOREIGN PATENT DOCUMENTS

| | | | | |
|---|---|---|---|---|
| CN | 106227344 | B * | 12/2019 | ......... G06F 3/04886 |
| JP | 2002203022 | A * | 7/2002 | ......... G06F 3/04886 |

(Continued)

OTHER PUBLICATIONS

Japanese Office Action issued in counterpart Japanese Application No. 2020-091389 dated Apr. 16, 2024.

(Continued)

*Primary Examiner* — Olusegun Goyea

(74) *Attorney, Agent, or Firm* — Maier & Maier, PLLC

(57) ABSTRACT

A congestion information display system includes: a sensor device that includes a housing which has a plurality of surfaces associated with congestion information indicating a congestion status of a facility, and an acceleration sensor configured to acquire an acceleration changed in accordance with a change in an orientation of the housing by a user's operation; a detection unit configured to detect a surface facing a predetermined direction among the plurality of surfaces based on the acceleration acquired by the acceleration sensor; a congestion information acquisition unit configured to acquire the congestion information associated with the surface detected by the detection unit; and a display processing unit configured to display, on a display device, the congestion information acquired by the congestion information acquisition unit.

9 Claims, 9 Drawing Sheets

(58) Field of Classification Search
USPC ........................................................... 705/15
See application file for complete search history.

(56) References Cited

FOREIGN PATENT DOCUMENTS

| | | | | |
|---|---|---|---|---|
| JP | 2004227433 A * | 8/2004 | ............. | G06F 17/60 |
| JP | 4122040 | 7/2008 | | |
| JP | 4122040 B2 * | 7/2008 | ........... | G06F 3/0346 |
| JP | 2010-244293 A | 10/2010 | | |
| JP | 2015095076 A | 5/2015 | | |
| JP | 2018-097736 A | 6/2018 | | |
| JP | 6414944 B1 | 10/2018 | | |
| JP | 2019095923 A | 6/2019 | | |
| WO | 2006022410 A1 | 3/2006 | | |

OTHER PUBLICATIONS

International Search Report (Form PCT/ISA/210); mailed Aug. 24, 2021 in corresponding PCT Application No. PCT/JP2021/019689 (2 pages) (2 pages) (English Translation).

* cited by examiner

| SENSOR ID | ACCELERATION | SURFACE INFORMATION |
|---|---|---|
| ID OF SENSOR DEVICE 100 | (g, 0, 0) | SURFACE A4 |
| | (−g, 0, 0) | SURFACE A2 |
| | (0, g, 0) | SURFACE A1 |
| | (0, −g, 0) | SURFACE A3 |
| | (0, 0, g) | SURFACE A5 |
| | (0, 0, −g) | SURFACE A6 |

| SENSOR ID | SURFACE INFORMATION | CONGESTION INFORMATION |
|---|---|---|
| ID OF SENSOR DEVICE 100 | SURFACE A1 | VACANT SEATS |
| | SURFACE A2 | FEW VACANT SEATS |
| | SURFACE A3 | NO VACANT SEATS |
| | SURFACE A4 | − |
| | SURFACE A5 | − |
| | SURFACE A6 | − |

Figure 6:
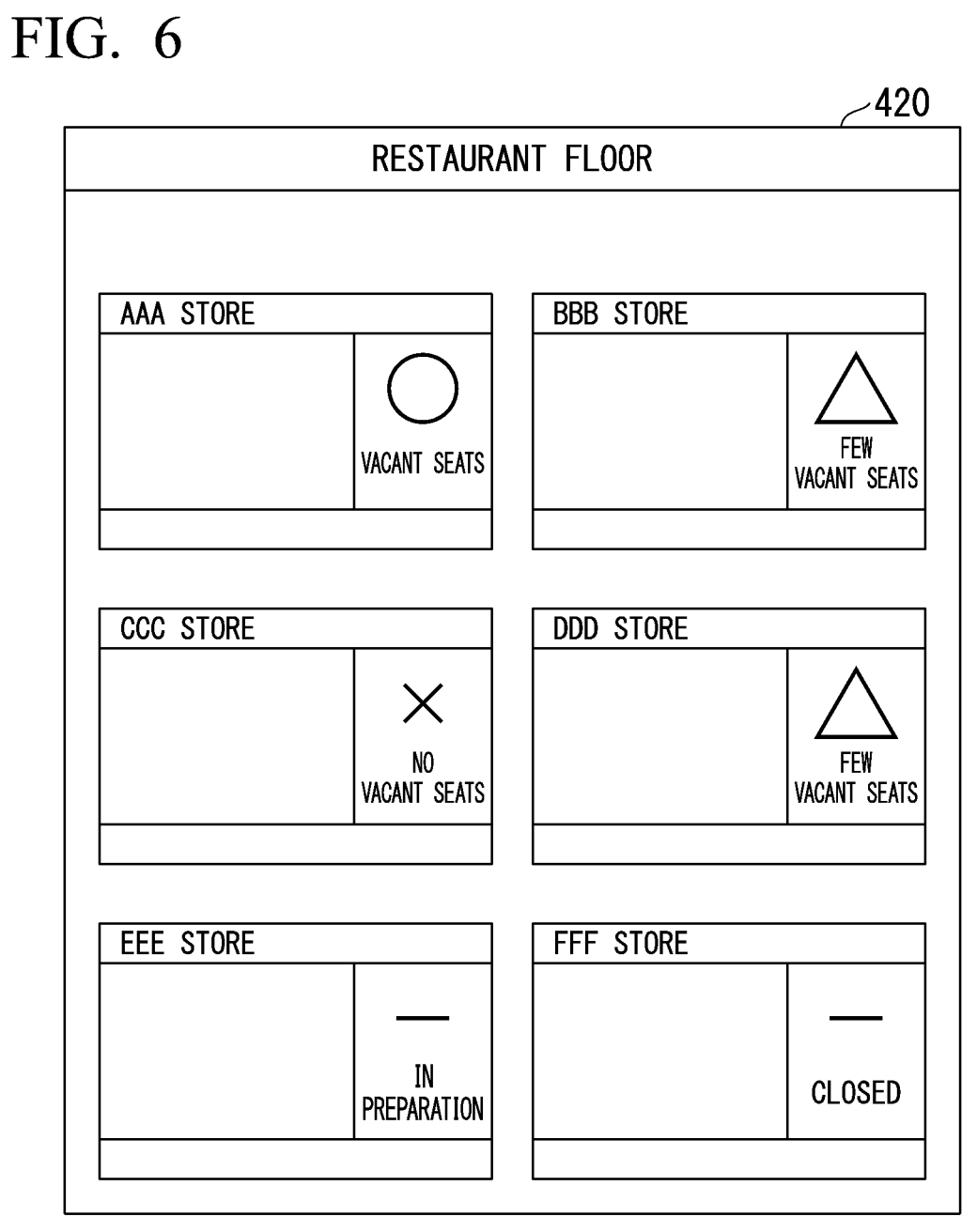

| RESTAURANT FLOOR |

AAA STORE

○

VACANT SEATS

BBB STORE

△

FEW
VACANT SEATS

CCC STORE

✕

NO
VACANT SEATS

DDD STORE

△

FEW
VACANT SEATS

EEE STORE

―

IN
PREPARATION

FFF STORE

―

CLOSED

| SENSOR ID | ACCELERATION | SURFACE INFORMATION |
|---|---|---|
| ID OF SENSOR DEVICE 100a | $(g, 0, 0)$ | SURFACE A4 |
| | $(-g, 0, 0)$ | SURFACE A2 |
| | $(0, g, 0)$ | SURFACE A1 |
| | $(0, -g, 0)$ | SURFACE A3 |
| | $(0, 0, g)$ | SURFACE A5 |
| | $(0, 0, -g)$ | SURFACE A6 |
| ID OF SENSOR DEVICE 100b | ⋮ | ⋮ |
| ⋮ | | |
| ID OF SENSOR DEVICE 100n | | |

FIG. 11

| TERMINAL ID | SURFACE INFORMATION | CONGESTION INFORMATION | USAGE INFORMATION |
|---|---|---|---|
| ID OF SENSOR DEVICE 100a | SURFACE A1 | VACANT SEATS | – |
| | SURFACE A2 | IN USE | MATH |
| | SURFACE A3 | IN USE | HOMEWORK OR THE LIKE |
| | SURFACE A4 | IN USE | SCIENCE/SOCIETY |
| | SURFACE A5 | IN USE | ENGLISH |
| | SURFACE A6 | IN USE | JAPANESE |
| ID OF SENSOR DEVICE 100b | | | |
| ⋮ | ⋮ | ⋮ | ⋮ |
| ID OF SENSOR DEVICE 100n | | | |

CONGESTION INFORMATION DISPLAY SYSTEM, SENSOR DEVICE, CONGESTION INFORMATION DISPLAY METHOD, AND STORAGE MEDIUM

CROSS REFERENCE TO RELATED APPLICATIONS

This application is a continuation application based on PCT International Patent Application No. PCT/JP2021/019689, filed on May 25, 2021, which claims priority to Japanese Patent Application No. 2020-091389, filed on May 26, 2020, in the Japan Patent Office. The contents of both the Japanese Patent Application and the PCT Application are incorporated herein by reference.

FIELD OF THE INVENTION

The present invention relates to a congestion information display system, a sensor device, a congestion information display method, and a storage medium.

DESCRIPTION OF RELATED ART

Conventionally, various technologies have been proposed for presenting real-time vacant seat information of a facility to customers who are considering going to a facility such as a restaurant or customers who are considering making a reservation.

For example, in the following Japanese Patent No. 6414944, a sensor or a camera detects that visitors to a store are seated. Japanese Patent No. 6414944 discloses a technology for updating in real-time vacant seat information referred to by a reserving party at the time of making a reservation based on the detected results.

However, a manager of a store may work on visually checking a congestion (vacancy) status and manually updating the congestion (vacancy) information. In a case of manual update, the manager needs to work on starting an application for management, logging in the application, and inputting the checked results, which takes a time to update. Thus, it is desired to reduce the efforts to manually update the congestion information by the manager of the facility such as a store.

In view of the above problems, an object of the present invention is to provide a congestion information display system, a sensor device, a congestion information display method, and a storage medium that allow the user to easily manually update facility congestion information.

SUMMARY OF INVENTION

According to one aspect of the present invention, a congestion information display system includes: a sensor device including a housing which has a plurality of surfaces associated with congestion information indicating a congestion status of a facility, and an acceleration sensor configured to acquire an acceleration changed in accordance with a change in an orientation of the housing by a user's operation; a detection unit configured to detect a surface facing a predetermined direction among the plurality of surfaces based on the acceleration acquired by the acceleration sensor; a congestion information acquisition unit configured to acquire the congestion information associated with the surface detected by the detection unit; and a display processing unit configured to display, on a display device, the congestion information acquired by the congestion information acquisition unit.

According to one aspect of the present invention, a sensor device includes: a housing which has a plurality of surfaces associated with congestion information indicating a congestion status of a facility; an acceleration sensor configured to acquire an acceleration changed in accordance with a change in an orientation of the housing by a user's operation; a detection unit configured to detect a surface facing a predetermined direction among the plurality of surfaces based on the acceleration acquired by the acceleration sensor; and a communication unit configured to transmit surface information indicating the surface detected by the detection unit to a device that acquires the congestion information of the facility based on the surface.

According to one aspect of the present invention, a congestion information display method includes: including, via a sensor device, a housing which has a plurality of surfaces associated with congestion information indicating a congestion status of a facility, and an acceleration sensor configured to acquire an acceleration changed in accordance with a change in an orientation of the housing by a user's operation; detecting, via a detection unit, a surface facing a predetermined direction among the plurality of surfaces based on the acceleration acquired by the acceleration sensor; acquiring, via a congestion information acquisition unit, the congestion information associated with the surface detected by the detection unit; and displaying, via a display processing unit, the congestion information acquired by the congestion information acquisition unit on a display device.

According to one aspect of the present invention, a computer-readable non-temporary storage medium having a program stored therein, the program for causing a computer to: acquire an acceleration changed in accordance with a change in an orientation of a housing by a user's operation, the housing having a plurality of surfaces associated with congestion information indicating a congestion status of a facility; detect a surface facing a predetermined direction among the plurality of surfaces based on the acceleration; acquire the congestion information associated with the detected surface; and display the congestion information on a display device.

According to the present invention, the user can easily manually update the facility congestion information.

BRIEF DESCRIPTION OF THE DRAWINGS

FIG. 6 is a diagram showing an example of display images showing congestion information of a plurality of facilities according to the first embodiment.

FIG. 11 is a diagram showing an example of a configuration of a congestion information table in a congestion information DB according to the second embodiment.

DETAILED DESCRIPTION OF THE PREFERRED EMBODIMENTS

Hereinafter, embodiments of the present invention will be described in detail with reference to the drawings. The drawings show an X-axis, a Y-axis, and a Z-axis that are orthogonal to each other, if necessary. In each axis, a direction in which an arrow extends is referred to as a "positive direction", and a direction opposite to the positive direction is referred to as a "negative direction".

1. First Embodiment

Figure 1:
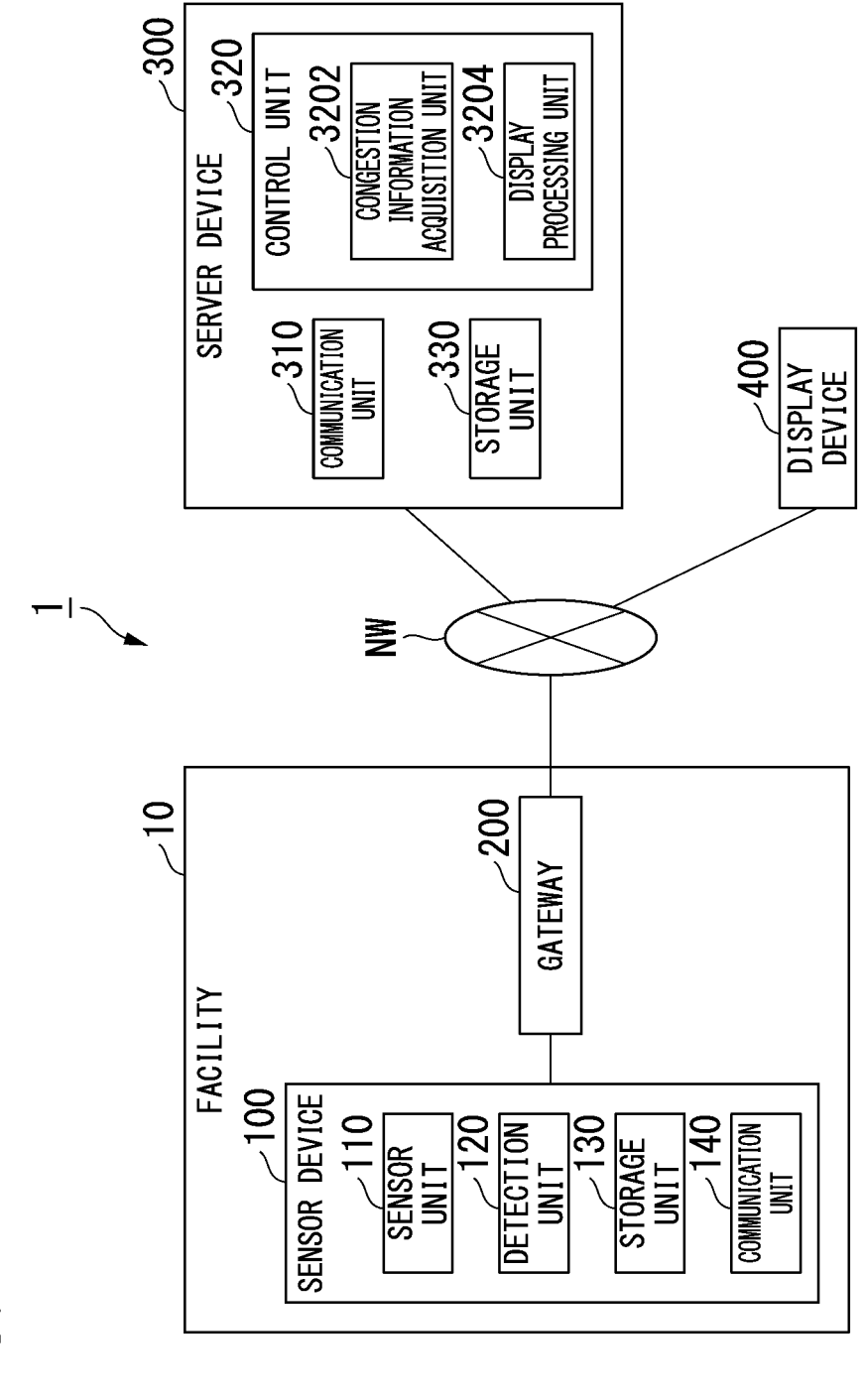
FIG. 1 is a diagram showing an example of a configuration of a congestion information display system according to a first embodiment.

A first embodiment of the present invention will be described with reference to FIGS. 1 to 7.
<1-1. Configuration of Congestion Information Display System>
FIG. 1 is a diagram showing an example of a configuration of a congestion information display system according to a first embodiment. As shown in FIG. 1, a congestion information display system 1 includes a sensor device 100, a gateway 200, a server device 300, and a display device 400. The sensor device 100 and the gateway 200 are provided in a facility 10. In the first embodiment, one sensor device 100 and one gateway 200 are provided for one facility 10.

The facility 10 is a display target of congestion information. The congestion information is information indicating a congestion status of the facility. Examples of the facility 10 include a facility that displays a vacancy status of seats as the congestion information and a facility that displays a usage status of equipment as the congestion information. The facility that displays the vacancy status of seats as the congestion information is, specifically, a restaurant, a movie theater, a self-study room such as a cram school, and the like. The facility that displays the usage status of equipment as the congestion information is, specifically, an exercise facility such as a fitness gym.

Hereinafter, an example will be described in the first embodiment that the facility 10 is a restaurant and the congestion information is information indicating a vacancy status in the restaurant.

The sensor device 100 acquires sensing information on the sensor device 100. The sensor device 100 includes a housing 101 and an acceleration sensor 102. For example, the sensor device 100 acquires an acceleration as sensing information by the acceleration sensor 102 provided in the housing 101 (see FIG. 2A), and detects a change in the acceleration in the sensor device 100. The acceleration sensor 102 may be provided inside or outside the housing 101. The sensor device 100 acquires, for example, an acceleration that is changed in accordance with a change in orientation of the housing 101 by a user's operation. The user changes the orientation of the housing 101 of the sensor device 100 by, for example, moving the sensor device 100 by hand.

A shape of the housing of the sensor device 100 is a three-dimensional shape having a plurality of surfaces. The congestion information of the facility 10 is associated with each of the plurality of surfaces of the housing. For example, the user turns a surface associated with the congestion information desired to be displayed on the display device 400, which will be described later, in a predetermined direction.

For example, a medium on which the congestion information is printed is attached to each surface of the housing 101 to which the congestion information is associated. As a result, the user can look at the medium to easily distinguish surfaces associated with target congestion information and turn the surfaces in the predetermined direction. In addition, the user can easily grasp the congestion information of the surface currently facing a predetermined direction by the medium. The congestion information associated with each surface of the housing 101 may be directly drawn, printed, or handwritten on each surface.

The sensor device 100 detects a surface facing a predetermined direction among the plurality of surfaces based on the acceleration acquired by the acceleration sensor 102. The predetermined direction is a direction in which the congestion information to be displayed on the display device 40 can be uniquely specified. For example, the predetermined direction is a vertically upward direction. When the predetermined direction is the vertically upward direction, for example, when the shape of the housing 101 is a rectangular parallelepiped having at least one set of two parallel surfaces, a cube, a cylinder, a prism, a polyhedron, and the like, the surface oriented in the vertically upward direction can be uniquely specified. Hereinafter, information indicating the surface facing the predetermined direction detected by the sensor device 100 is also referred to as "surface information". Hereinafter, it is assumed in the embodiment that the predetermined direction is the vertically upward direction.

The sensor device 100 is communicably connected to the gateway 200. For example, the sensor device 100 communicates with the gateway 200 by wireless connection such as Bluetooth (registered trademark) and Wi-Fi (registered trademark). The sensor device 100 transmits various information to the gateway 200 by communication. For example, the sensor device 100 includes identification information, sensing information, surface information, operation information, and the like of the sensor device 100. The identification information is an identification (ID) unique to the sensor device 100. Hereinafter, the ID is also referred to as a "sensor ID". The operation information is information for determining whether or not the sensor device 100 is operating, and is, for example, information indicating a remaining amount of a battery of the sensor device 100.

Figure 2A:
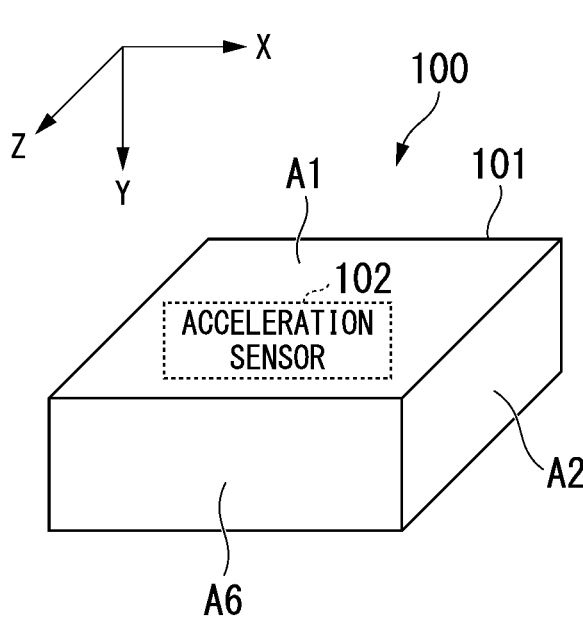
FIG. 2A is a perspective view of an external configuration of a sensor device according to the first embodiment.
Figure 2B:
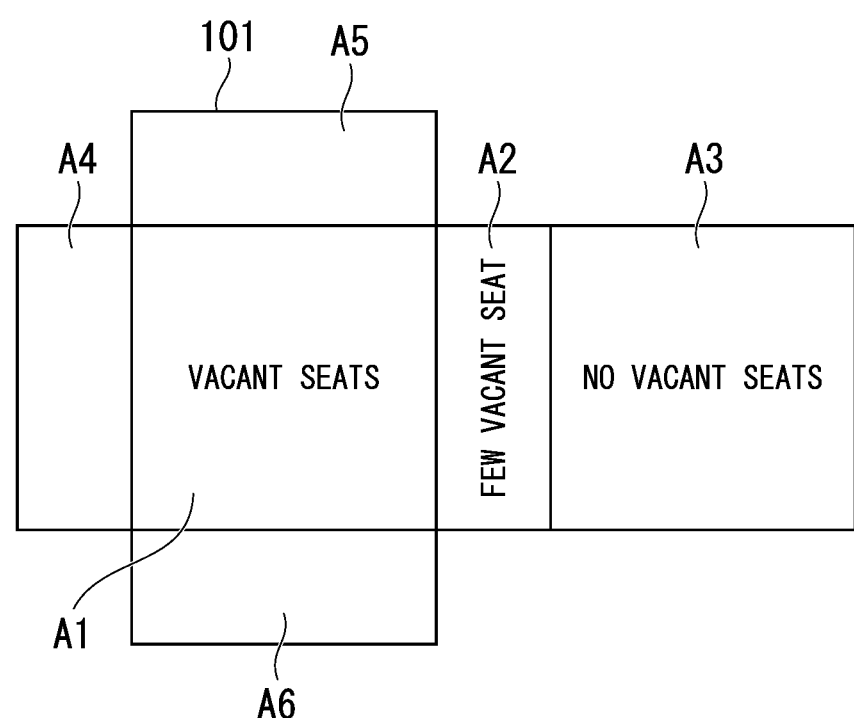
FIG. 2B is a development view of a housing of the sensor device according to the first embodiment.

Here, an external configuration of the sensor device 100 will be described with reference to FIGS. 2A and 2B. FIG. 2A is a perspective view of the external configuration of the sensor device 100 according to the first embodiment. FIG. 2B is a development view of the housing 101 of the sensor device 100 according to the first embodiment.

As shown in FIG. 2A, the shape of the housing 101 of the sensor device 100 is a rectangular parallelepiped. The shape of the housing 101 is not limited to the rectangular parallelepiped, and may be a cube, a cylinder, a prism, or a polyhedron.

The congestion information is associated with at least two surfaces among the surfaces of the housing 101 of the sensor device 100. For example, among six surfaces A1 to A6 in the housing 101 shown in FIG. 2B, the congestion information is associated with the three surfaces of the surface A1, the surface A2, and the surface A3. Specifically, the congestion information is associated with the surface A1, which is referred to as "vacant seats", the surface A2, which is referred to as "few vacant seats", and the surface A3, which is referred to as "no vacant seats".

A user (for example, a manager of the facility 10) places the sensor device 100 so that among the surfaces A1 to A6 of the housing 101, the surface associated with the congestion information desired to be displayed on the display device 400, which will be described later, faces a predetermined direction. For example, when there are vacant seats in the facility 10, the user places the sensor device 100 so as to turn the surface A1 upward. Further, when there are no vacant seats in the facility 10, the user places the sensor device 100 so as to turn the surface A3 upward.

In addition to the congestion information, public relations (PR) information may be associated with the surfaces A1 to A6. The PR information is, for example, information desired to be appealed to the user of the facility 10. An example of the information include information such as "only 10 YY set meals are still available". By registering the PR information in advance in association with any surfaces associated with the congestion information, the PR information can be displayed on the display device 400 together with the congestion information. For example, the user checks the PR information, and a user's desire to visit the store can thus be improved. The user may or may not visibly check the PR information using the medium described above, or the like.

The gateway 200 is a device that relays between the sensor device 100 and the server device 300. The gateway 200 is communicably connected to the server device 300 by a network NW. The gateway 200 transmits various information input from the sensor device 100 to the server device 300 via the network NW. Here, various information is identification information, sensing information, surface information, and operation information of the sensor device 100. The gateway 200 also transmits the identification information of the gateway 200 to the server device 300, in addition to various information input from the sensor device 100. The identification information is an ID unique to the gateway 200. Hereinafter, the ID is also referred to as a "gateway ID". Since one gateway 200 is provided for one facility 10, the facility 10 can be specified by associating the gateway ID with a facility name and the like.

The gateway 200 and the server device 300 are connected to each other by, for example, a wide area network (WAN). The WAN is realized by, for example, internet connection.

The server device 300 is a device that acquires the congestion information of the facility 10 based on the surface information of the sensor device 100. The server device 300 receives various information including the surface information from the gateway 200 via the network NW. The server device 300 acquires the congestion information based on the surface information received from the gateway 200.

Further, the server device 300 is connected to the display device 400 by the network NW. The server device 300 is communicably connected to the gateway 200. The server device 300 transmits the congestion information to the display device 400 via the network NW.

The server device 300 and the display device 400 are connected by, for example, the WAN.

The display device 400 is a device that displays the congestion information. The display device 400 receives the congestion information from the server device 300 and displays the congestion information via the network NW.

The display device 400 is realized by, for example, a device such as a smartphone, a tablet terminal, a personal computer (PC), or a digital signage.

<1-2. Functional Configuration of Sensor Device>

The functional configuration of the sensor device 100 according to the first embodiment will be described with reference to FIG. 1. As shown in FIG. 1, the sensor device 100 includes a sensor unit 110, a detection unit 120, a storage unit 130, and a communication unit 140.

(1) Sensor Unit 110

The sensor unit 110 has a function of acquiring the sensing information on the sensor device 100. In the embodiment, as an example, the function of the sensor unit 110 is realized by the acceleration sensor 102. The acceleration sensor 102 acquires the acceleration of the sensor device 100 as the sensing information. After acquiring the sensing information, the sensor unit 110 inputs the acceleration of the sensor device 100 acquired by the acceleration sensor 102 to the detection unit 120.

(2) Detection Unit 120

The detection unit 120 detects a surface facing a predetermined direction among the plurality of surfaces based on the acceleration acquired by the acceleration sensor 102. For example, the detection unit 120 detects a surface associated with the acceleration acquired by the acceleration sensor 102 among the plurality of surfaces as the surface facing the predetermined direction. After detecting the surface facing a predetermined direction, the detection unit 120 inputs, to the communication unit 140, the surface information indicating the surface of the housing 101 facing the vertically upward direction.

Specifically, the detection unit 120 detects the surface of the housing 101 facing the vertically upward direction, based on the acceleration acquired by the acceleration sensor 102 after the orientation of the housing 101 is changed. The acceleration is a gravity acceleration g acquired after the orientation of the housing 101 is changed. After the user operates the sensor device 100 to change the orientation, it is preferable to place the sensor device 100 so as not to move. As a result, a value of the acceleration measured by the acceleration sensor 102 can be made closer to a value of the gravity acceleration g. The acceleration sensor 102 of the first embodiment is an acceleration sensor 102 capable of detecting acceleration in three axial directions, and the gravity acceleration detected in each axial direction is associated with each surface of the housing 101 in advance.

For example, the directions of the three axes are set as the X-axis, Y-axis, and Z-axis shown in FIG. 2A. In this case, when the sensor device 100 is placed so that the surface A1 faces upward, the acceleration detected in a stationary state is $(0, g, 0)$. Therefore, the surface A1 is associated with the acceleration $(0, g, 0)$ in advance, such that the detection unit 120 can detect that the surface A1 faces upward when the acceleration $(0, g, 0)$ is detected. Similarly, the surface A2 is associated with the acceleration $(-g, 0, 0)$, the surface A3 is associated with the acceleration $(0, -g, 0)$, the surface A4 is associated with the acceleration $(g, 0, 0)$, the surface A5 is associated with the acceleration $(0, 0, g)$, and the surface A6 is associated with the acceleration $(0, 0, -g)$. Information in which the acceleration of the sensor device 100 and the surface facing upward (surface information) are associated with each other is stored in a surface information database (DB) of the storage unit 130.

As a result, the detection unit 120 can detect the surface of the housing 101 facing the vertically upward direction, based on the acceleration acquired in the stationary state after the orientation of the sensor device 100 is changed by the user's operation.

(3) Storage Unit 130

The storage unit 130 is configured by storage media such as a hard disk drive (HDD), a flash memory, electrically erasable programmable read only memory (EEPROM), random access read/write memory (RAM), and read only memory (ROM), or any combination of these storage media. As the storage unit 130, for example, a non-volatile memory can be used.

The storage unit 130 has a function of storing various information. For example, the storage unit 130 stores, in the surface information DB, the information in which the acceleration of the sensor device 100 and surface information (information indicating the surface facing the vertically upward direction) are associated with each other.

(4) Communication Unit 140

The communication unit 140 has a function of transmitting and receiving various information. For example, the communication unit 140 transmits various information input from the detection unit 120 to the server device 300. Various information is transmitted to the server device 300 via the gateway 200 and the network NW.

<1-3. Functional Configuration of Server Device>

The functional configuration of the server device 300 according to the first embodiment will be described with reference to FIG. 1. As shown in FIG. 1, the server device 300 includes a communication unit 310, a control unit 320, and a storage unit 330.

(1) Communication Unit 310

The communication unit 310 has a function of transmitting and receiving various information. For example, the communication unit 310 receives various information from the sensor device 100 via the gateway 200 and the network NW. Specifically, the communication unit 310 receives the identification information, the sensing information, the surface information, the operation information of the sensor device 100, and identification information and the like of the gateway 200. The communication unit 310 inputs the received various information to the control unit 320.

Further, the communication unit 310 transmits the congestion information input from the control unit 320, which will be described later, to the display device 400 via the network NW.

(2) Control Unit 320

The control unit 320 has a function of controlling the overall operation of the server device 300. The control unit 320 is realized by causing a central processing unit (CPU) provided as hardware in the server device 300 to execute a program, for example.

(2-1) Congestion Information Acquisition Unit 3202

The congestion information acquisition unit 3202 has a function of acquiring the congestion information. For example, the congestion information acquisition unit 3202 acquires the congestion information based on the surface information input from the communication unit 310. The congestion information acquisition unit 3202 inputs the acquired congestion information to the display processing unit 3204.

Specifically, the congestion information acquisition unit 3202 acquires the congestion information associated with the surface of the housing 101 facing the vertically upward direction as indicated by the surface information. The congestion information acquisition unit 3202 acquires the congestion information from a congestion information DB that stores the information in which the surface information of the sensor device 100 and the congestion information are associated with each other.

(2-2) Display Processing Unit 3204

The display processing unit 3204 has a function of controlling display processing of the congestion information. For example, the display processing unit 3204 displays the congestion information input from the congestion information acquisition unit 3202 on the display device 400. Specifically, the display processing unit 3204 generates a display image showing the congestion information based on the congestion information. After generating the display image, the display processing unit 3204 transmits the display image to the display device 400 via the communication unit 310 and displays the display image.

The display processing unit 3204 can visualize the congestion information of the facility 10 by displaying the display image on the display device 400. When the facility 10 is a restaurant as in the embodiment, the display processing unit 3204 can display congestion information such as a vacancy status. The user of the restaurant can adjust a usage time zone, usage mode, and the like of the restaurant by checking the congestion information displayed on the display device 400.

For example, the user can check the congestion status in advance, to thereby adjust the usage time zone and shorten the waiting time so as to avoid the congestion time zone such as lunch time. In addition, the user can check the congestion status in advance, to thereby visit the store on the premise of taking out without using the store for avoiding the congestion. Further, the user avoids the congestion based on the congestion status, to thereby avoid other users crowded in the store. Thus, the congestion information display system 1 can alleviate a stress on the user due to the congestion or level the congestion in the store by visualizing the congestion information.

(3) Storage Unit 330

The storage unit 330 is configured by storage media such as a hard disk drive (HDD), a flash memory, electrically erasable programmable read only memory (EEPROM), random access read/write memory (RAM), and read only memory (ROM), or any combination of these storage media. As the storage unit 330, for example, a non-volatile memory can be used.

The storage unit 330 has a function of storing various information. For example, the storage unit 330 stores information in which the surface information of the sensor device 100 and the congestion information are associated with each other in the congestion information DB.

<1-4. Data Structure>

An example of data stored in various DBs will be described with reference to FIGS. 3 and 4.

(1) Surface Information DB

Figures 3, 4, 5:
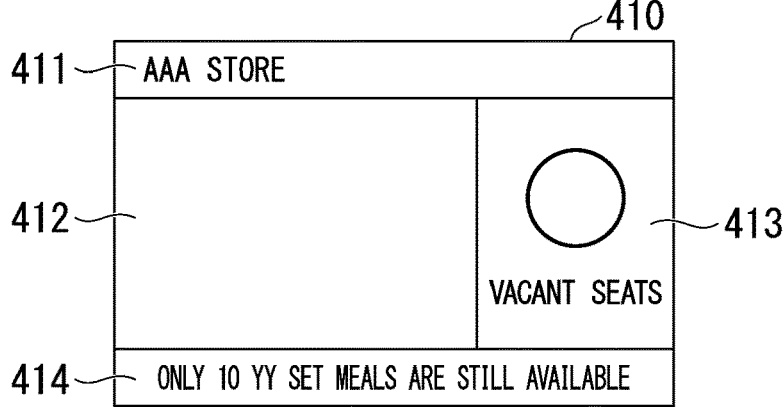
FIG. 3 is a diagram showing an example of a configuration of a surface information table in a surface information DB according to the first embodiment.
FIG. 4 is a diagram showing an example of a configuration of a congestion information table in a congestion information DB according to the first embodiment.
FIG. 5 is a diagram showing an example of a display image showing congestion information of one facility according to the first embodiment.

FIG. 3 is a diagram showing an example of a configuration of a surface information table in the surface information DB according to the first embodiment. As shown in FIG. 3, a record of the surface information table includes the sensor ID, the acceleration, and the surface information. The information included in the record of the surface information table is not limited to the above example.

In a first record of the surface information table shown in FIG. 3, the sensor ID "ID of the sensor device 100", the acceleration (g, 0, 0), and the surface information "surface A4" are associated with each other. This indicates that the surface facing the vertically upward direction is "surface A4" when the acceleration of the sensor device 100 is (g, 0, 0).

In a second record, the sensor ID "ID of the sensor device 100", the acceleration (−g, 0, 0), and the surface information "surface A2" are associated with each other. This indicates that the surface facing the vertically upward direction is "surface A2" when the acceleration of the sensor device 100 is (−g, 0, 0).

In a third record, the sensor ID "ID of the sensor device 100", the acceleration (0, g, 0), and the surface information "surface A1" are associated with each other. This indicates that the surface facing the vertically upward direction is "surface A1" when the acceleration of the sensor device 100 is (0, g, 0).

In a fourth record, the sensor ID "ID of the sensor device 100", the acceleration (0, −g, 0), and the surface information "surface A3" are associated with each other. This indicates that the surface facing the vertically upward direction is "surface A3" when the acceleration of the sensor device 100 is (0, −g, 0).

In a fifth record, the sensor ID "ID of the sensor device 100", the acceleration (0, 0, g), and the surface information "surface A5" are associated with each other. This indicates that the surface facing the vertically upward direction is "surface A5" when the acceleration of the sensor device 100 is (0, 0, g).

In a sixth record, the sensor ID "ID of the sensor device 100", the acceleration (0, 0, −g), and the surface information "surface A6" are associated with each other. This indicates that the surface facing the vertically upward direction is "surface A6" when the acceleration of the sensor device 100 is (0, 0, −g).

(2) Congestion Information DB

FIG. 4 is a diagram showing an example of a configuration of a congestion information table in a congestion information DB according to the first embodiment. As shown in FIG. 4, a record of the congestion information table includes the sensor ID, the surface information, and the congestion information. The information included in the record of the congestion information table is not limited to the above example.

In a first record of the congestion information table shown in FIG. 4, the sensor ID "ID of the sensor device 100", the surface information "surface A1", and the congestion information "vacant seats" are associated with each other. This indicates that the congestion information when the surface of the sensor device 100 facing the vertically upward direction is "surface A1" is "vacant seats".

In a second record, the sensor ID "ID of the sensor device 100", the surface information "surface A2", and the congestion information "few vacant seats" are associated with each other. This indicates that the congestion information when the surface of the sensor device 100 facing the vertically upward direction is "surface A2" is "few vacant seats".

In a third record, the sensor ID "ID of the sensor device 100", the surface information "surface A3", and the congestion information "no vacant seats" are associated with each other. This indicates that the congestion information when the surface of the sensor device 100 facing the vertically upward direction is "surface A3" is "no vacant seats".

In a fourth record, the sensor ID "ID of the sensor device 100", the surface information "surface A4", and the congestion information "-" are associated with each other. This indicates that the congestion information when the surface of the sensor device 100 facing the vertically upward direction is "surface A4" is "-". That is, the congestion information is not associated with "surface A4".

In a fifth record, the sensor ID "ID of the sensor device 100", the surface information "surface A5", and the congestion information "-" are associated with each other. This indicates that the congestion information when the surface of the sensor device 100 facing the vertically upward direction is "surface A5" is "-". That is, the congestion information is not associated with "surface A5".

In a sixth record, the sensor ID "ID of the sensor device 100", the surface information "surface A6", and the congestion information "-" are associated with each other. This indicates that the congestion information when the surface of the sensor device 100 facing the vertically upward direction is "surface A6" is "-". That is, the congestion information is not associated with "surface A6".

<1-5. Display Image>

An example of a display image showing the congestion information will be described with reference to FIGS. 5 and 6.

(1) Display Image of One Facility

FIG. 5 is a diagram showing an example of a display image showing congestion information of one facility 10 according to the first embodiment. A display image 410 shown in FIG. 5 is an example of a layout for displaying congestion information of one restaurant. As shown in FIG. 5, the layout of the display image 410 is configured by a display area 411 to a display area 414.

The display area 411 is an area for displaying a store name of the restaurant, and is displayed as "AAA store".

The display area 412 is an area for displaying store information of the restaurant. The store information may be displayed in any format such as a photograph or a sentence.

The display area 413 is an area for displaying the congestion information of the restaurant, and is displayed with the symbol "0" and the text "vacant seats" as information indicating that there is a vacant seat. When it is indicated that there are few vacant seats, the display area 413 may be displayed with the symbol "A" and the text "few vacant seats". When it is indicated that there is no vacant seat, the display area 413 may be displayed with the symbol "X" and the text "no vacant seats".

The display area 414 is an area for displaying the PR information of the restaurant, and is displayed as "only 10 YY set meals are still available".

The layout of the display image 410, the displayed information, and the like are not limited to the above examples.

(2) Display Image of A Plurality of Facilities

FIG. 6 is a diagram showing an example of display images showing congestion information of a plurality of facilities 10 according to the first embodiment. The display image 420 shown in FIG. 6 is an example of a layout for displaying congestion information of a plurality of restaurants. As shown in FIG. 6, the display image 420 displays display images of the plurality of restaurants. The layout of the display image of each restaurant is the same as the layout shown in FIG. 5.

When the plurality of restaurants exist in one facility 10 such as a restaurant tenant building or a restaurant floor of a commercial facility, the congestion information of each restaurant may be collectively displayed in one display image like the display image 420.

<1-6. Processing Flow>

Figure 7:
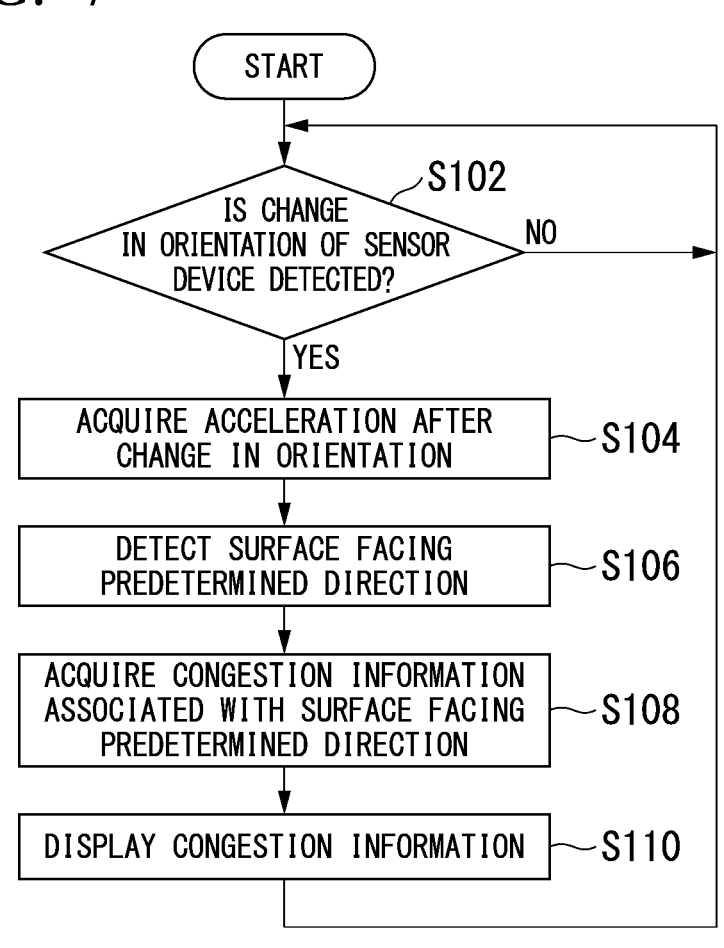
FIG. 7 is a flowchart showing an example of a processing flow in the congestion information display system according to the first embodiment.

A processing flow in the congestion information display system 1 according to the first embodiment will be described with reference to FIG. 7. FIG. 7 is a flowchart showing an example of the processing flow in the congestion information display system 1 according to the first embodiment.

As shown in FIG. 7, first, the congestion information display system 1 determines whether or not a change in the orientation of the sensor device 100 is detected (S102). The change in the orientation of the sensor device 100 is detected, for example, when the orientation of the sensor device 100 is changed by the user's operation. Specifically, when the detection unit 120 of the sensor device 100 detects the change in the acceleration acquired by the sensor unit 110, the detection unit 120 detects the change in the orientation of the sensor device 100.

When the change in the orientation of the sensor device 100 is not detected (S102/NO), the congestion information display system 1 repeats the process from S102.

When the change in the orientation of the sensor device 100 is detected (S102/YES), the congestion information display system 1 acquires acceleration after the change in the orientation of the sensor device 100 (S104). The acceleration after the change in the orientation of the sensor device 100 is acquired by the sensor unit 110 of the sensor device 100.

Next, the congestion information display system 1 detects a surface of the housing of the sensor device 100 that faces a predetermined direction (S106). For example, the detection unit 120 of the sensor device 100 refers to the surface information DB, and the sensor unit 110 detects the surface indicated by the surface information that is associated with the acceleration acquired after the change in the orientation of the sensor device 100 as the surface facing the predetermined direction.

Next, the congestion information display system 1 acquires congestion information associated with the surface information of the sensor device 100 (S108). For example, the congestion information acquisition unit 3202 of the server device 300 refers to a congestion information DB, and acquires the congestion information associated with the surface information of the sensor device 100.

Finally, the congestion information display system 1 displays the congestion information (S110). For example, the display processing unit 3204 of the server device 300 generates a display image showing the congestion information, and displays the display image on the display device 400. After displaying the congestion information, the congestion information display system 1 repeats the process from S102.

2. Second Embodiment

A second embodiment of the present invention will be described with reference to FIGS. 8 to 12. In the second embodiment, an example in which a plurality of sensor devices 100 are provided for one facility 10 will be described. In the following, the descriptions overlapping with the first embodiment described above will be omitted.

<2-1. Configuration of Congestion Information Display System>

Figure 8:
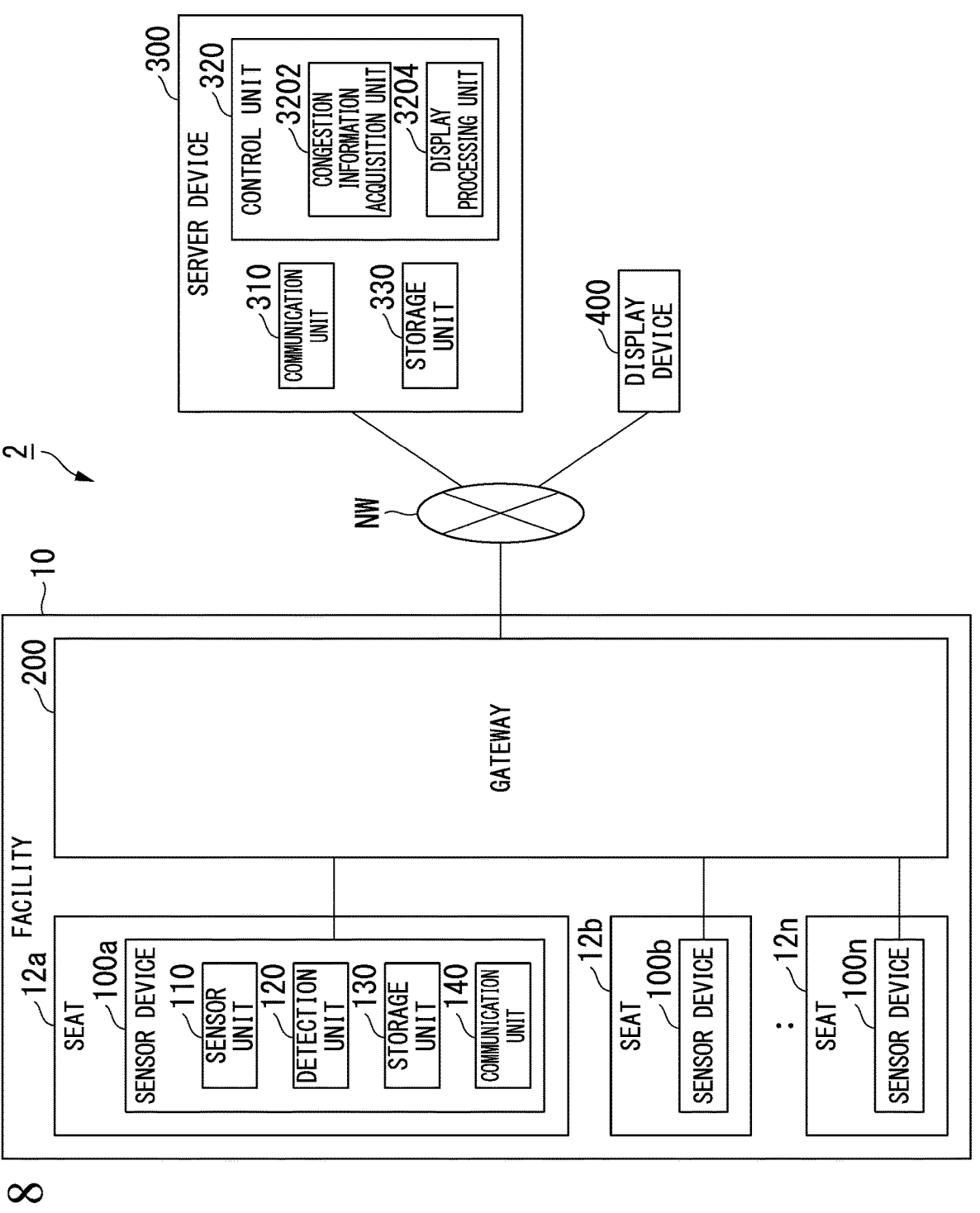
FIG. 8 is a diagram showing an example of a configuration of a congestion information display system according to a second embodiment.

FIG. 8 is a diagram showing an example of a configuration of a congestion information display system according to a second embodiment. As shown in FIG. 8, a congestion information display system 2 includes a sensor devices 100a to 100n (n is a natural number), a gateway 200, a server device 300, and a display device 400. The sensor devices 100a to 100n and the gateway 200 are provided in a facility 10. Hereinafter, an example in which the facility 10 is a "self-study room of a cram school" will be described.

In the second embodiment, the sensor devices 100a to 100n are each provided in seats 12a to 12n. As a result, the sensor devices 100a to 100n can acquire congestion information of each of the seats 12a to 12n.

Figures 9, 10:
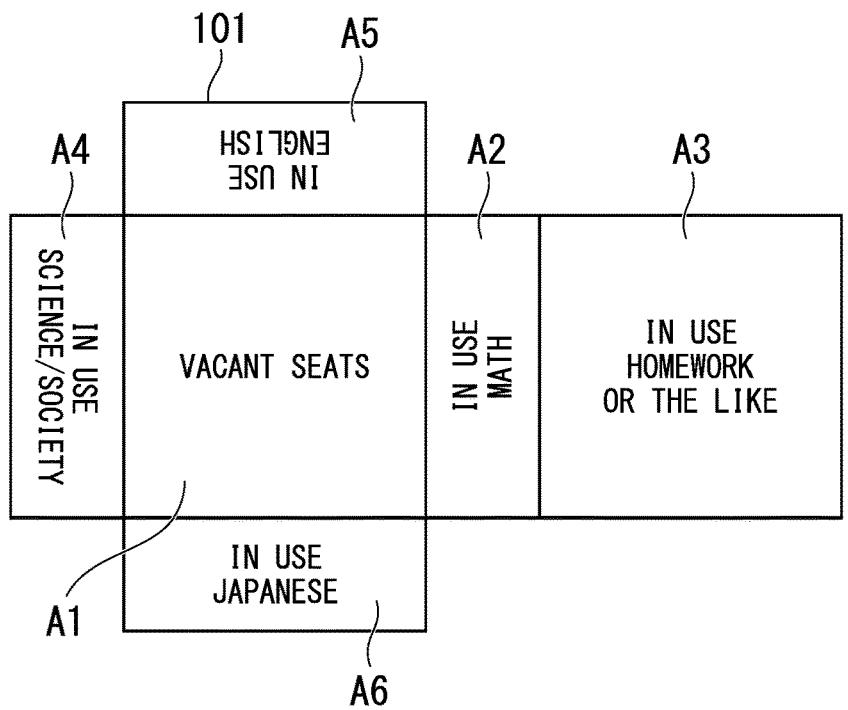
FIG. 9 is a development view of a housing of the sensor device according to the second embodiment.
FIG. 10 is a diagram showing an example of a configuration of a surface information table in surface information DB according to the second embodiment.

Here, an external configuration of the sensor device 100 will be described with reference to FIG. 9. FIG. 9 is a development view of the housing of the sensor device 100 according to the second embodiment. Since the external configuration of the sensor device 100 according to the second embodiment is the same as the external configuration of the sensor device 100 according to the first embodiment, detailed descriptions thereof will be omitted.

The congestion information of the seat 12 having the sensor device 100 provided therein is associated with each surface of the housing 101 of the sensor device 100 according to the second embodiment. For example, the congestion information is associated with all surfaces A1 to A6 in the housing 101 shown in FIG. 9. Specifically, congestion information of "vacant seats" is associated with the surface A1. Congestion information of "in use" is associated with each of the surfaces A2 to A6. When the congestion information indicating "in use" is associated with the surface of the housing 101, information indicating how the seat is used (hereinafter also referred to as "usage information") is further associated. As for the usage information, "math" is associated with the surface A2, "homework or the like" is associated with the surface A3, "science/society" is associated with the surface A4, "English" is associated with the surface A5, and "Japanese" is associated with the surface A6. This indicates that the user of the self-study room of the cram school is studying a subject or homework indicated by the usage information. The usage information is mainly used for marketing, but may be included in the congestion information displayed on the display device 400.

Since the gateway 200 according to the second embodiment has the same function as the gateway 200 according to the first embodiment described with reference to FIG. 1, detailed descriptions thereof will be omitted.

Since the server device 300 according to the second embodiment has the same function as the server device 300 according to the first embodiment described with reference to FIG. 1, detailed descriptions thereof will be omitted.

Since the display device 400 according to the second embodiment has the same function as the display device 400 according to the first embodiment described with reference to FIG. 1, detailed descriptions thereof will be omitted.

<2-2. Functional Configuration of Sensor Device>

Since the functional configuration of the sensor device 100 according to the second embodiment is the same as the functional configuration of the sensor device 100 according to the first embodiment, which has been described with reference to FIG. 1, detailed descriptions thereof will be omitted.

<2-3. Functional Configuration of Server Device>

Since the functional configuration of the server device 300 according to the second embodiment is the same as the functional configuration of the server device 300 according to the first embodiment described with reference to FIG. 1, detailed descriptions thereof will be omitted.

<2-4. Data Structure>

An example of data stored in various DBs will be described with reference to FIGS. 10 and 11.

(1) Surface Information DB

FIG. 10 is a diagram showing an example of a configuration of a surface information table in the surface information DB according to the second embodiment. As shown in FIG. 10, a record of the surface information table includes the sensor ID, the acceleration, and the surface information. The information included in the record of the surface information table is not limited to the above example.

In the surface information table shown in FIG. 10, surface information from the sensor devices 100*a* to 100*n* is registered. In the first to sixth records, the same data as that described with reference to FIG. 3 is shown as the surface information of the sensor device 100*a*. The same data as that of the sensor device 100*a* is also registered in the surface information of the sensor devices 100*b* to 100*n*.

(2) Congestion Information DB

FIG. 11 is a diagram showing an example of a configuration of a congestion information table in a congestion information DB according to the second embodiment. As shown in FIG. 11, a record of the congestion information table includes the sensor ID, the surface information, the congestion information, and the usage information. The information included in the record of the congestion information table is not limited to the above example.

In the first record of the congestion information table shown in FIG. 11, the sensor ID "ID of the sensor device 100*a*", the surface information "surface A1", the congestion information "vacant seats", and the usage content "-" are associated with each other. This indicates that the congestion information when the surface of the sensor device 100*a* facing the vertically upward direction is "surface A1" is "vacant seats", which means that it is not used.

In the second record, the sensor ID "ID of the sensor device 100*a*", the surface information "surface A2", the congestion information "in use", and the usage content "math" are associated with each other. This indicates that the congestion information when the surface of the sensor device 100*a* facing the vertically upward direction is "surface A2" is "in use", which means that it is used for studying "math".

In the third record, the sensor ID "ID of the sensor device 100*a*", the surface information "surface A3", the congestion information "in use", and the usage content "homework or the like" are associated with each other. This indicates that the congestion information when the surface of the sensor device 100*a* facing the vertically upward direction is "surface A3" is "in use", which means that it is used for studying "homework or the like".

In the fourth record, the sensor ID "ID of the sensor device 100*a*", the surface information "surface A4", the congestion information "in use", and the usage content "science/society" are associated with each other. This indicates that the congestion information when the surface of the sensor device 100*a* facing the vertically upward direction is "surface A4" is "in use", which means that it is used for studying "science/society".

In the fifth record, the sensor ID "ID of the sensor device 100*a*", the surface information "surface A5", the congestion information "in use", and the usage content "English" are associated with each other. This indicates that the congestion information when the surface of the sensor device 100*a* facing the vertically upward direction is "surface A5" is "in use", which means that it is used for studying "English".

In the sixth record, the sensor ID "ID of the sensor device 100*a*", the surface information "surface A6", the congestion information "in use", and the usage content "Japanese" are associated with each other. This indicates that the congestion information when the surface of the sensor device 100*a* facing the vertically upward direction is "surface A6" is "in use", which means that it is used for studying "Japanese".

In the congestion information DB, the congestion information of the sensor device 100*b* to the sensor device 100*n* is also registered in the same manner as the congestion information of the sensor device 100*a*.

<2-5. Display Image>

An example of a display image showing congestion information will be described with reference to FIG. 12.

Figure 12:
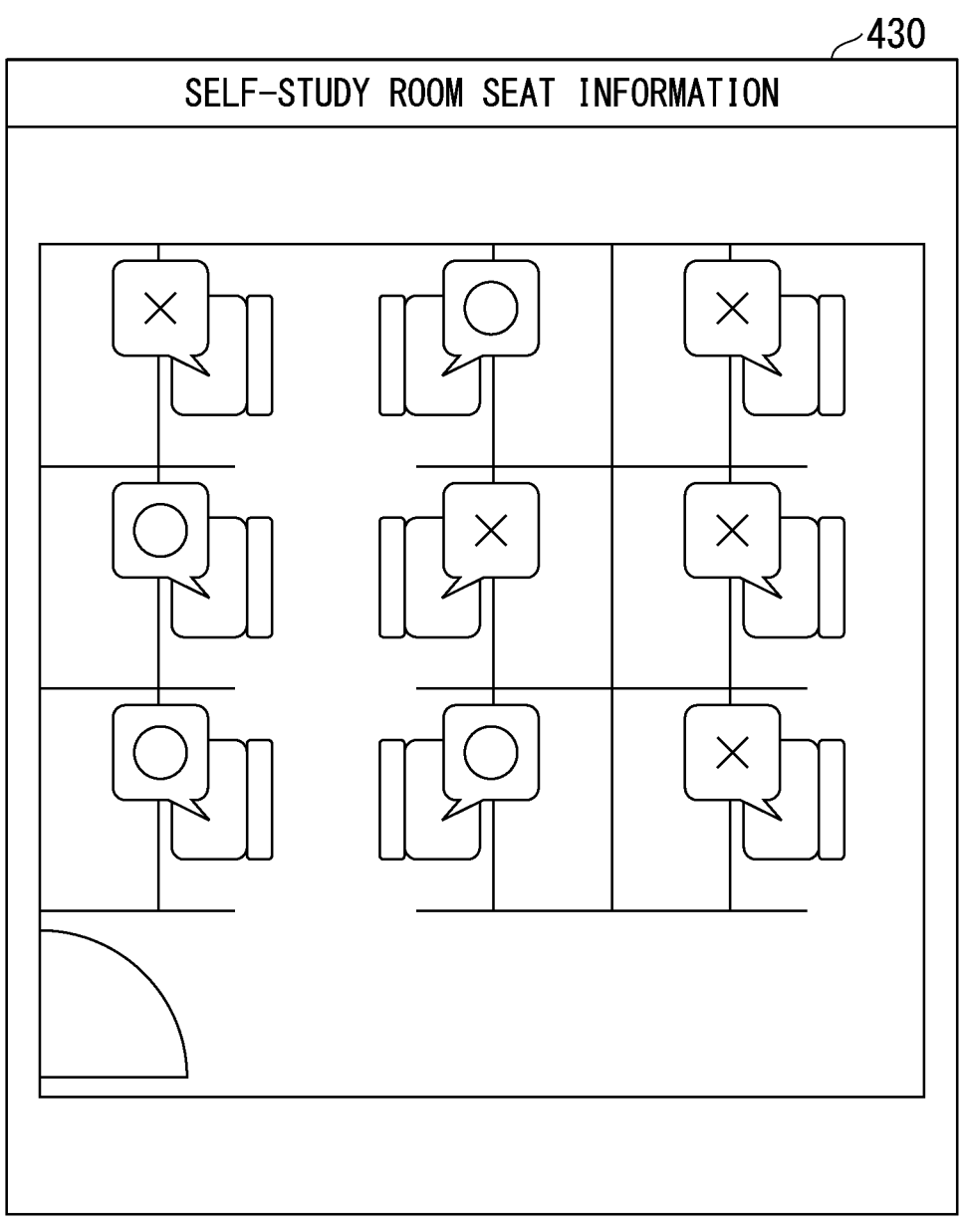
FIG. 12 is a diagram showing an example of display of congestion information for each seat according to the second embodiment.

FIG. 12 is a diagram showing an example of display of congestion information for each seat according to the second embodiment. A display image 430 shown in FIG. 12 is an image showing congestion information for each seat in the self-study room of the cram school. As shown in FIG. 12, the display image 430 shows congestion information acquired for each seat based on sensing information of the sensor devices 100*a* to 100*n* provided for each of the seats 12*a* to 12*n* shown in FIG. 8. For example, vacant seats are marked with "0" in a speech balloon. On the other hand, non-vacant seats are marked with "X" in the speech balloon.

A layout, displayed information of the display image 430, and the like are not limited to the examples described above.

<2-6. Processing Flow>

Since a processing flow in the congestion information display system 2 according to the second embodiment is the same as the processing flow in the congestion information display system 1 according to the first embodiment described with reference to FIG. 7, detailed descriptions thereof will be omitted. However, in the second embodiment, it is necessary to perform processing as many as the number of sensor devices 100 provided in the facility 10.

The embodiments of the present invention have been described.

As described above, the sensor device 100 of the congestion information display system according to the embodiments of the present invention includes an acceleration sensor 102 that acquires an acceleration changed in accordance with the change in the orientation of the housing 101 by the user's operation, in the housing 101 having the plurality of surfaces associated with the congestion information indicating congestion statuses of the facility 10.

The detection unit 120 of the congestion information display system detects a surface facing a predetermined direction among the plurality of surfaces based on the acceleration acquired by the acceleration sensor 102.

The congestion information acquisition unit 3202 of the congestion information display system acquires the congestion information associated with the surface detected by the detection unit 120.

The display processing unit 3204 of the congestion information display system displays the congestion information acquired by the congestion information acquisition unit 3202 on the display device 400.

With the above configuration, the congestion information display system acquires, by the user, the congestion information associated with the surface facing the predetermined direction, and displays the acquired congestion information on the display device 400. As a result, the user updates the congestion information displayed on the display device 400 only by making the surface, which is associated with the congestion information desired to be displayed, face the predetermined direction.

Therefore, in the congestion information display system according to the embodiments of the present invention, the user can easily manually update the congestion information of the facility 10.

3. Modified Example

Modified examples of the embodiment of the present invention will be described.

The modified examples described below may be applied to the embodiments of the present invention alone, or may be applied to the embodiments of the present invention in combination. In addition, the modified examples may be applied instead of the configuration described in the embodiments of the present invention, or may be additionally applied to the configuration described in the embodiments of the present invention.

(1) First Modified Example

In the embodiments described above, an example in which the congestion information display system 1 is applied to visualization of a vacancy status in the restaurant or the self-study room of the cram school has been described. However, the embodiments are not limited to the example described above. For example, the congestion information display system 1 may be applied to the visualization of the congestion status of a cash register of the store (for example, a cash register of a food court). The user can adjust a timing of lining up at the cash register by visualizing the congestion status of the cash register. As a result, it is possible to prevent crowding of users or staff near the cash register. Further, the staff of the store can grasp the current status of each cash register.

Thus, the congestion information display system 1 can alleviate a stress on the users or staff due to the crowding near the cash register or level the congestion of the cash register, by visualizing the congestion information.

The congestion information display system 1 may display congestion information indicating the congestion status of the cash register on a bulletin board (digital signage) in the store, or may display the congestion information on the website of the store. Further, waiting times such as "waiting for 5 minutes", "waiting for 10 minutes", and "waiting for 20 minutes" are associated with the surfaces A1 to A6 of the housing 101 of the sensor device 100 as the congestion information. As a result, the waiting time at the cash register is displayed on the bulletin board or website of the store. The user can check the displayed waiting time, to thereby easily grasp the time zone in which the congestion can be avoided.

Moreover, the congestion information display system 1 can display real-time product information as the PR information, to thereby efficiently appeal products desired to be provided to the user. The real-time product information is, for example, special sale information, profitable information, and the like. As the information, for example, information corresponding to each corner may be displayed for each corner such as a food court. As a result, the store can provide the user with a real-time advertising service for each spot. Accordingly, it is expected to increase a customer unit price per user.

(2) Second Modified Example

For example, the congestion information display system 1 may be applied to visualization of a congestion status in a playroom for children provided in the store. As a result, it is expected to level the congestion in the playroom, alleviate the stress on the users and staff, and improve a customer service.

(3) Third Modified Example

For example, the congestion information display system 1 may be applied to visualization of a congestion status in a rest room for babies provided in the store. As a result, it is expected to alleviate the congestion in the playroom (rest room for babies) and eliminate crowding of the users. Furthermore, it is expected to have an effect of improving an image as a facility that is friendly to families for raising children.

(4) Fourth Modified Example

The surfaces A1 to A6 of the housing 101 of the sensor device 100 may be associated with the crowding information indicating a crowding status according to the congestion status. For example, when the congestion status is "vacant seats", information indicating that the facility 10 can be used without being crowded with other users, specifically, a message such as "there is no concern about crowding." is associated. On the other hand, when the congestion status is "congested", information indicating that there is a risk of congesting with other users, specifically, a message such as "there may be congested" is associated.

As a result, the congestion information display system 1 can display the crowding information according to the congestion status of the facility 10 on the display device 400. The user can check the crowding information displayed on the display device 400 in advance, to thereby avoid the crowding of other users.

(5) Fifth Modified Example

In the above-described embodiments, an example in which the detection unit 120 detects the change in the orientation of the sensor device 100 and detects the surface facing the predetermined direction has been described. However, the embodiments are not limited to the example described above. The function of the detection unit 120 of the sensor device 100 may be realized by the server device 300. In this case, the sensing information acquired by the sensor unit 110 of the sensor device 100 is transmitted to the server device 300 via the communication unit 140.

The modified examples of the embodiments of the present invention have been described.

The congestion information display system 1 in the above-described embodiments may be realized by a computer. In that case, the congestion information display system 1 may be realized by causing a program for realizing the function to record a computer-readable recording medium and read the program recorded in the recording medium into a computer system. The "computer system" referred to herein includes an OS and hardware such as peripherals. In addition, the "computer-readable recording medium" refers to portable media such as a flexible disk, a magneto-optical disk, a ROM, and a CD-ROM, and a storage device such as a hard disk built in the computer system. Furthermore, the computer-readable recording medium may include a medium that dynamically holds a program for a short time, like a communication line when the program is transmitted via a network such as the Internet or a communication circuit such as a telephone line, and a medium that holds a program for a predetermined time, like a volatile memory in a computer system serving as a server or a client in that case. In addition, the program may be configured to realize a part of the above-described function, may be configured to realize the above-described function by combination with the program recorded in advance in a computer system, or may be configured to realize the program by using a programmable logic device such as field programmable gate array (FPGA).

The embodiments described above can be expressed as follows.

A computer-readable non-temporary storage medium having a program stored therein, the program for causing a computer to:

acquire an acceleration changed in accordance with a change in an orientation of a housing by a user's operation, the housing having a plurality of surfaces associated with congestion information indicating a congestion status of a facility;

detect a surface facing a predetermined direction among the plurality of surfaces based on the acceleration;

acquire the congestion information associated with the detected surface; and display the congestion information on a display device.

Although the embodiments of the invention have been described in detail with reference to the drawings, the specific configuration is not limited to the embodiments, and various design modifications and the like may be made without departing from the gist of the invention.

INDUSTRIAL APPLICABILITY

According to the present invention, the user can easily manually update the facility congestion information.

What is claimed is:

1. A congestion information display system comprising: a sensor device, a server device, and a display device connected to each other by via a network, wherein the sensor device includes a housing which has a plurality of surfaces associated with congestion information indicating a congestion status of a facility;

an acceleration sensor configured to acquire an acceleration changed in accordance with a change in an orientation of the housing by a user's operation wherein the sensor device is configured to process the acceleration acquired by the acceleration sensor to detect a surface facing a predetermined direction among the plurality of surfaces and store a detection result in a memory of the sensor device; and a wireless communication antenna configured to transmit various information from the memory to the server device, and the server device is configured to use a central processing unit provided as hardware in the server device to acquire the congestion information associated with the surface detected by the sensor device from a congestion information database that stores information in which surface information which is information indicating the surface facing the predetermined direction and the congestion information associated with the surface are associated with each other; and generate a display image showing the congestion information based on the congestion information, transmit the display image to a display device, and display, on the display device, the acquired congestion information.

2. The congestion information display system according to claim 1, wherein the sensor device detects a surface associated with the acceleration acquired by the acceleration sensor among the plurality of surfaces as the surface facing the predetermined direction.

3. The congestion information display system according to claim 1, wherein the acceleration is a gravity acceleration acquired after the change in the orientation of the housing.

4. The congestion information display system according to claim 1, wherein the predetermined direction is a vertically upward direction.

5. The congestion information display system according to claim 1, wherein a medium on which the congestion information is printed is attached to the surface associated with the congestion information.

6. The congestion information display system according to claim 1, wherein the sensor device is configured to repeatedly poll the acceleration sensor for a change in orientation prior to a change in orientation occurring.

7. The congestion information display system according to claim 1, wherein the display image further comprises at least one option selectable by the user, and wherein the server device is further configured to dynamically vary the option selectable by the user based on the congestion information.

8. The congestion information display system according to claim 7, wherein the option selectable by the user comprises a price displayed to a user on a storefront interface.

9. The congestion information display system according to claim 1, wherein the server device is communicatively coupled to a plurality of sensor devices including a first sensor device associated with a first geographical area and a second sensor device associated with a second geographical area different from the first geographical area; and wherein the server device is configured to display the acquired congestion information by providing a map depicting at least the first geographical area and the second geographical area, each of the first geographical area and second geographical area having a display indicator paired therewith, wherein the server device is configured to update a first display indicator paired with the first geographical area based on an output of the first sensor device and is configured to update a second display indicator paired with the second geographical area based on an output of the second sensor device.

* * * * *